United States Patent
Choi

(10) Patent No.: US 12,498,903 B2
(45) Date of Patent: Dec. 16, 2025

(54) SYSTEM AND METHOD WITH MEDICAL DATA COMPUTING

(71) Applicant: Pusan National University Industry-University Cooperation Foundation, Busan (KR)

(72) Inventor: Byung Kwan Choi, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 222 days.

(21) Appl. No.: 18/452,315

(22) Filed: Aug. 18, 2023

(65) Prior Publication Data

US 2024/0078089 A1 Mar. 7, 2024

(30) Foreign Application Priority Data

Sep. 5, 2022 (KR) .......................... 10-2022-0111860

(51) Int. Cl.
*G16H 50/50* (2018.01)
*G06F 8/20* (2018.01)
*G06F 8/33* (2018.01)
*G06F 8/38* (2018.01)

(52) U.S. Cl.
CPC .................. *G06F 8/24* (2013.01); *G06F 8/33* (2013.01); *G06F 8/38* (2013.01); *G16H 50/50* (2018.01)

(58) Field of Classification Search
CPC ..................................... G06F 8/33; G06F 8/38
See application file for complete search history.

(56) References Cited

U.S. PATENT DOCUMENTS

| 9,311,048 | B1 * | 4/2016 | Kapoor | G06F 16/1727 |
| 10,489,122 | B1 * | 11/2019 | Abbott | G06F 8/34 |
| 10,585,849 | B2 | 3/2020 | Choi et al. | |
| 10,593,430 | B2 * | 3/2020 | Kondo | G16H 70/60 |
| 11,094,417 | B2 * | 8/2021 | Kano | G06F 3/14 |
| 2009/0087049 | A1 * | 4/2009 | Takahashi | G16H 15/00 382/128 |
| 2012/0176408 | A1 * | 7/2012 | Moriya | G16H 15/00 345/629 |
| 2012/0191793 | A1 * | 7/2012 | Jakobovits | G16H 30/20 709/206 |
| 2013/0111387 | A1 * | 5/2013 | Li | G16H 10/60 715/771 |

(Continued)

FOREIGN PATENT DOCUMENTS

KR 10-2013-0102310 A 9/2013
KR 10-2013-0116519 A 10/2013

(Continued)

*Primary Examiner* — Francisco J Aponte
(74) *Attorney, Agent, or Firm* — NSIP Law

(57) ABSTRACT

A system and a method including a receiving module configured to receive medical data from a medical institution server, a data extraction module configured to extract text data for a body region from the medical data, an image calling module configured to call or generate image data modeling from a position and a shape of the body region by using extracted text data, an object calling module configured to call the image data as an object, and a code editing module configured to write or edit a programming code for the body region corresponding to a called object according to a received input.

11 Claims, 15 Drawing Sheets

(56) References Cited

U.S. PATENT DOCUMENTS

| | | | | |
|---|---|---|---|---|
| 2014/0067414 | A1* | 3/2014 | Choi | G16H 50/50 |
| | | | | 705/2 |
| 2016/0125162 | A1* | 5/2016 | Takata | G16H 30/40 |
| | | | | 705/2 |
| 2016/0364525 | A1* | 12/2016 | Takei | A61B 5/055 |
| 2018/0024995 | A1* | 1/2018 | Choi | G06F 16/00 |
| | | | | 707/736 |
| 2018/0144828 | A1* | 5/2018 | Baker | G01N 33/57434 |
| 2019/0279416 | A1* | 9/2019 | Lee | G06T 19/20 |
| 2020/0176096 | A1* | 6/2020 | Kubota | G16H 30/40 |
| 2020/0211683 | A1* | 7/2020 | Kubota | G16H 15/00 |
| 2021/0098089 | A1* | 4/2021 | Choi | G16H 50/20 |
| 2025/0157628 | A1* | 5/2025 | Barve | G16H 30/20 |

FOREIGN PATENT DOCUMENTS

| | | |
|---|---|---|
| KR | 10-2015-0016186 A | 2/2015 |
| KR | 10-2019-0138601 A | 12/2019 |
| KR | 10-2261680 B1 | 6/2021 |

* cited by examiner

Liver test result sheet(230)

| Prescription date | Test name | Result | Pprevious result | Unit |
|---|---|---|---|---|
| 2022.08.21 | AST | 32 | 28 | U/L |
| | ALT | 27 | 20 | U/L |
| | T.Bilirubin | 1.57 | 1.23 | mg/dL |
| | D.Bilirubin | 0.60 | 0.52 | mg/dL |
| | Albumin | 4.32 | 4.56 | g/dL |
| | Creatinine | 1.11 | 1.21 | mg/dL |

Extracted text data(240)

| Attribute | Value |
|---|---|
| AST | 32 |
| ALT | 27 |
| T.Bilirubin | 1.57 |
| D.Bilirubin | 0.60 |
| Albumin | 4.32 |
| Creatinine | 1.11 |

FIG. 9
```
model_name = LIVER;
if(Liver_AST_Value > 200)
    CallDoctor();
if(Liver_ALT_Value > 200)
    CallDoctor();
if(Liver_severity_Value > 50)
    BecomeObjectRed();
```
FIG. 10a
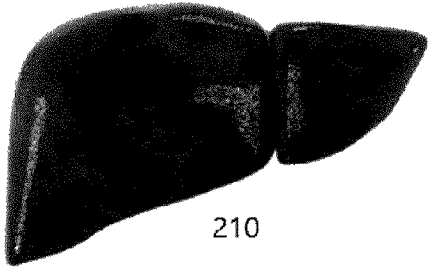
| | |
|---|---|
| 1.Model name | liver |
| 2.AST(IU/L) | |
| 3.ALT(IU/L) | |
| 4.SEVERITY | |
210
FIG. 10b
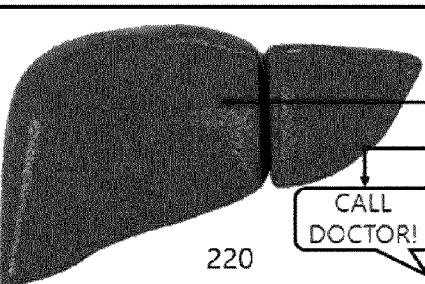
| | | |
|---|---|---|
| 1.Model name | | liver |
| 2.AST(IU/L) | 200 or more | 4890 |
| 3.ALT(IU/L) | | 4746 |
| 4.SEVERITY | | 79 |
| | 50 or more | |
220  CALL DOCTOR!

FIG. 17

```
public class Model
{
    public string model_Name;      // Model name ex) Lesion 1, Liver
    public Vector3[ ] Human body region;  // Vector3 is structure that implements three-dimensional coordinates
                                   // If vector3={2, 3, 4}, point's x-coordinate is 2, y-coordinate is 3, and z-coordinate is 4 public int Liver_AST_Value;    // AST(IU/L)
    public int Liver_ALT_Value;    // ALT(IU/L)

public float Total_Bilirubin;  // TotalBilirubin(mg/dL)

public Model(string name, Vector3[ ] coordinates, int input_Liver_AST_Value
        , int input_Liver_ALT_Value, float input_Total_Bilirubin)
    {
        model_Name = name;
        Human body region = coordinates;
        Liver_AST_Value = input_Liver_AST_Value;
        Liver_ALT_Value = input_Liver_ALT_Value;
        Total_Bilirubin = input_Total_Bilirubin;
        if (input_Liver_ALT_Value > 200)        // Call doctor when ALT value is 200 or more
            CallDoctor();
        if (input_Liver_AST_Value > 200)        // Call doctor when AST value is 200 or more
            CallDoctor();
        if (input_Total_Bilirubin > 1.0f)       // When Total_Bilirubin value is 1.0 or more, human body model becomes red
            BecomeObjectRed();
    }
}
```

83

84

SYSTEM AND METHOD WITH MEDICAL DATA COMPUTING

CROSS REFERENCE TO RELATED APPLICATION

The present application claims priority under 35 USC § 119(a) of Korean Patent Application No. 10-2022-0111860, filed Sep. 5, 2022, the entire disclosure of which are incorporated herein by reference for all purposes.

BACKGROUND

1. Field of the Invention

The present disclosure relates to a system and a method with medical data computing.

2. Description of the Related Art

Medical data is not standardized in typical medical systems and thus it is difficult to share data between medical institutions, even in instances when prospective medical institutions have computerized their medical records. In addition, even if medical data were to be standardized in an effort to share information, there are limitations in expressing patient-specific information that represents individual health information.

In addition, COVID-19 has led to greater interest in non-face-to-face treatment options. Accordingly, the demand for non-face-to-face healthcare is increasing. At the same time, as medical technology develops, the need for advanced medical devices and medical software also increases. Therefore, there is an increased demand for medical software and medical systems to account for non-face-to-face healthcare and the development of advanced medical devices.

When creating advanced medical devices and medical software, software developers who do not have a medical background may not appreciate the challenges and needs that medical software typically requires.

Therefore, there is a need for a technology that allows users, including developers without professional medical knowledge, to visualize anatomical body information, which is difficult to be understood, and to designate the information as an object so that attributes-values suitable for medical characteristics can be calculated and utilized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter In a general aspect, here is provided a system including a receiving module configured to receive medical data from a medical institution server, a data extraction module configured to extract text data for a body region from the medical data, an image calling module configured to call or generate image data modeling from a position and a shape of the body region by using extracted text data, an object calling module configured to call the image data as an object, and a code editing module configured to write or edit a programming code for the body region corresponding to a called object according to a received input.

The data extraction module may classify and extract state information of an attribute-value format for each attribute of the body region from the text data extracted in correspondence to the body region, and the system further may include a data registration module configured to store and register the state information for each attribute by matching the state information with the image data called or generated in correspondence to the body region.

In a case in which the programming code includes an attribute value for a specific attribute of each of two or more body regions and an operator targeting the attribute value, the code editing module may perform a group calculation of the attribute value according to whether one or more of a range or data type of the attribute and a unit of the attribute value matches.

The system may include a display part configured to display the object on a user terminal screen according to a user request and to provide an interface for receiving, from an interface, a region selection command for one or more body regions in an area on the user terminal screen corresponding to the object.

When the region selection command is received through the interface, the display part may be configured to display the one or more body regions in the user terminal screen according to the region selection command to receive user selection information, and the system may include an interest region designation part configured to designate a selected body region corresponding to the received selection information as a region of interest according to an input and a control part configured to control the code editing module so that the designated region of interest is objectified and programmed.

The display part may be configured to display the region selection command in one of a list format, a check box format, and a radio button format.

In a general aspect, here is provided a processor-implemented method including extracting text data for one or more body regions from received medical data, generating image data to model a position and a shape of the one or more body regions by using the extracted text data, calling the generated image data as a called object, and generating a programming code for the body region corresponding to the called object according to an input.

In the extracting, state information of an attribute-value format may be classified and extracted for each attribute of the body region from the text data extracted in correspondence to the body region, and the method may include storing and registering the state information for each attribute by matching the state information with the image data in correspondence to the body region after the generating of the image data.

In the generating, in a case in which the programming code input may include an attribute value for a specific attribute of each of two or more body regions and an operational input targeting the attribute value, a group calculation of the attribute value may be performed according to whether at least one of a range or data type of the attribute and a unit of the attribute value matches.

The method may include displaying the object on a user terminal screen according to a received request and providing an interface for receiving a region selection command for selecting one or more selected body regions in an area on the screen corresponding to the object.

In the providing, when the region selection command is received, the one or more selected body regions illustrated in the screen area according to the region selection command is displayed in one of a list format, a check box format, and a radio button format to receive user selection information, and the method may also include designating a designated body region corresponding to the received selection information as a region of interest and controlling the designated region of interest to be objectified and programmed before the generating of the programming code.

The received medical data may be received from a medical institution server.

The generating of the image data may include calling the image data.

The generating of the programming code may include one of editing or writing the programming code.

In a general aspect, here is provided an electronic apparatus including a processor configured to execute instructions and a memory storing the instructions, wherein execution of the instructions configures the processor to extract text data for a body region from received medical data, generate image data including modeling of a position and a shape of the body region by using the extracted text data, an object calling module configured to call the image data as an object, and generating a programming code for the body region corresponding to a called object responsive to an input.

BRIEF DESCRIPTION OF THE DRAWINGS

FIG. 9 illustrates example code written by a code editing module of FIG. 3 according to one or more embodiments.

FIGS. 10A and 10B illustrate examples of a case in which image data and an interface are displayed on a user terminal screen by the display part of FIG. 3 according to one or more embodiments.

FIG. 17 illustrates an example of variable codes and function codes generated respectively by a variable code generation part and a function code generation part of FIG. 13 according to one or more embodiments.

Figure 1:
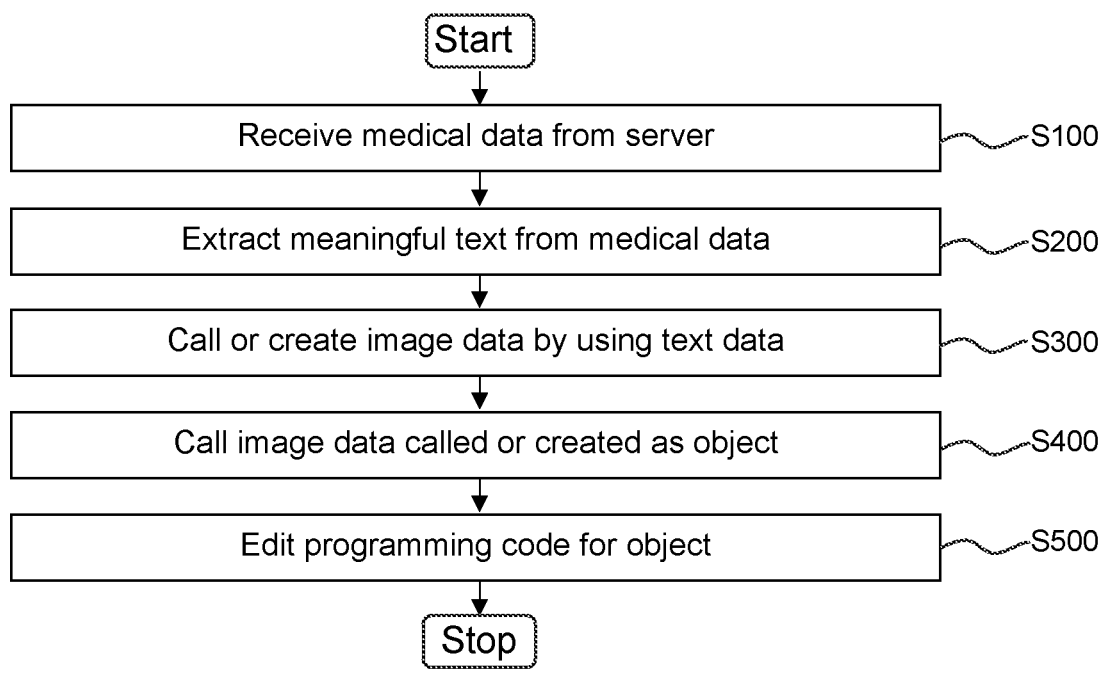
FIG. 1 illustrates an example method according to one or more embodiments.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such tams "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all tams, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In the present disclosure, medical data may refer to healthcare-related data such as health information and medical treatment information, and this term may also include data such as "medical record data", "clinical research data", "public institution data (Health Insurance Corporation, National Statistical Office, and Insurance Review and Assessment Service, etc.)", "device-based data", "omics data", "lifelog data", "app and social media data", and "healthcare-related advertisement data" depending on the type of medical big data.

In addition, the medical data may be data including various health records such as progress notes including electronic medical records (EMR), surgical records, and discharge summaries, text data for various test records such as a disease name or diagnosis name, symptom, a blood test result, a radiology report, an operation name, a nursing record, nursing treatment, a consent form, electromyogram, and electrocardiogram, etc., images taken by X-ray and ultrasound examination X-ray, and scan images and nuclear medicine examination images taken through MRI, CT, and PET tests.

In the present disclosure, a "user" is a person who can write codes for object editing and function execution and develop medical devices and medical software through this, and may include programmers and developers who can perform coding.

In an example, a system for computing medical data according to the present disclosure may be communicatively connected to a predetermined terminal and may be performed by a module capable of writing and editing codes by using image data modeling the positions and shapes of a plurality of body regions constituting a whole body on the basis of medical data.

The system for computing medical data according to the present disclosure may be in a state in which the system can transmit and receive data by being communicatively connected with at least one user terminal through a server-based application that implements the above-described functions, may preset at least one of a plurality of body regions constituting image data as a region of interest including a region or organ to be monitored on the basis of information input from the corresponding terminal, and may write and execute programming codes for presetting a criterion for determining a medical condition of a preset region of interest.

Accordingly, one or more embodiments may enable developers such as general programmers without professional medical knowledge to intuitively understand unfamiliar body parts through objectified image data. In addition, by writing or editing codes, each object can be calculated, or information thereof can be changed in a format in which a user wants.

In an example, with medical data that can be expressed on the basis of codes and visualizations, it is possible to develop a high-quality clinical decision support system (CDSS) and express customized information for patients.

Figure 3:
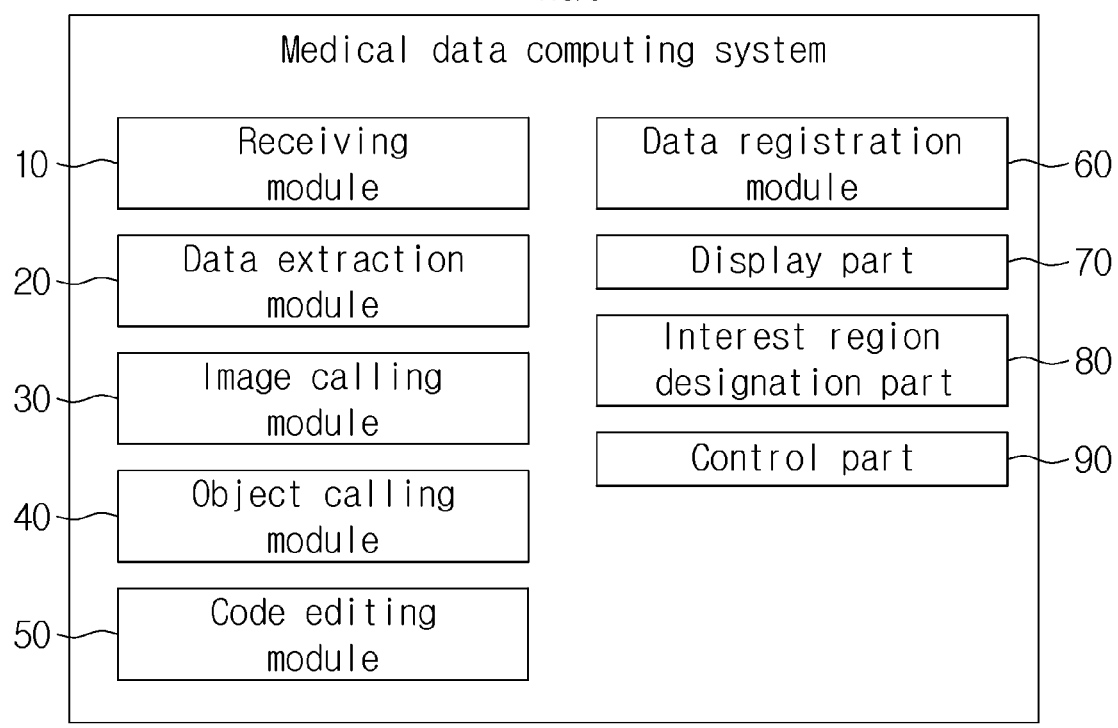
FIG. 3 illustrates an example system according to one or more embodiments.

FIG. 3 illustrates an example system according to one or more embodiments. Referring to FIG. 3, in a non-limiting example, a system 300 for computing medical data may include a receiving module 10, a data extraction module 20, an image calling module 30, an object calling module 40, a code editing module 50, a data registration module 60, a display part 70, an interest region designation part 80, and a control part 90.

The receiving module 10 may receive medical data from a medical institution server.

In an example, the receiving module 10 may be configured as at least one of a communication device, software, and a server which are capable of collecting medical information scattered in each medical institution.

The receiving module 10 may perform data communication with the medical institution server to obtain a plurality of patient-specific medical data pre-stored in the corresponding server.

In a non-limiting example, the medical institution server may store and manage medical data of a medical institution using one or more of an electronic medical record (EMR) system, an order communication system (OCS), a hospital information system (HIS), and a clinical information system (CIS), etc.

In an example, the medical data may be data including various health records such as progress notes including electronic medical records (EMR), surgical records, and discharge summaries, text data for various test records such as a disease name or diagnosis name, symptom, a blood test result, a radiology report, an operation name, a nursing record, nursing treatment, a consent form, electromyogram, and electrocardiogram, etc., images taken by X-ray and ultrasound examination X-ray, and scan images and nuclear medicine examination images taken through MRI, CT, and PET tests.

In an example, the medical data may also include a medical image of a predetermined lesion generated in each patient's body region and diagnostic record information based thereon. In an example, the medical data may be data concerning a case in which lesions generated in the bone, muscle, ligament, arteries, vein, lymphatic, and nerves are located in the patient's body region.

In this case, the medical image may be an image obtained from at least one medical imaging device and may, for example, include an image obtained through the capturing of a part of the patient's body through a photographic examination device, such as X-ray, computed tomography (CT), magnetic resonance imaging (MRI), single photon emission computed tomography (SPECT), and positron emission tomography (PET).

In addition, in this example case, the diagnostic record information may be based on one or more medical images, the images including one or more of the location of a lesion, disease name, and diagnosis name information according to a medical staff reading a lesion included in the corresponding medical image, and may be an image file obtained by scanning a diagnosis record document or a text file electronically documented.

In an example, the data extraction module 20 may extract text data for at least one body region from medical data received by the receiving module 10.

In an example, the data extraction module 20 may extract clinical documents or electronic chart data of a medical institution as text data for a plurality of preset body regions by classifying the data for each body region.

In an example, the data extraction module 20 may extract data from data received from other hospitals, data stored in servers outside the hospital, data stored in personal devices, and data received from various medical devices.

In an example, the text data, which may include data obtained from clinical records, electronic medical records, progress notes, discharge summaries, medical terminology, or other medical data, such as image data 210 illustrated in FIG. 10a as discussed in greater detail below, may be expressed in a number of textual or numerical formats, may refer to text data included in the category of medical data, such as the name of disease or diagnosis, symptoms, blood test results, radiology reports, names of operations, nursing records, and nursing treatment.

In an example, the text data may not be limited to the name of diagnosis, but may also include anatomical parts, names of procedures, and blood pressure values, etc. or may include various textual data indicating a patient's condition, such as "critical", "light", "large", and "small", etc.

In an example, the text data may be texts representing various languages such as Korean or English such as "지방간", "ankle pain", and "heart failure", standardized data such as "K76.0", "61515", "N05", and "M51.0" which are numbers or a combination of letters and numbers, standardized medical terms or medical term codes, or data expressed in numbers as a test result of 10.3 gram/deciliter of hemoglobin level.

In this case, the standardized medical term codes may refer to data that defines medical concepts in SNOMED-CT, ICD-9, ICD-10, ICD-11, LOINC, CPT, ATC, RxNorm, ICNP, and NMDS, etc.

In an example, the data extraction module 20 may classify and extract state information of an attribute-value format for each attribute of a corresponding body region from text data extracted in correspondence to each body region.

Figure 4:
FIG. 4 illustrates an example extraction process by a data extraction module of FIG. 3 according to one or more embodiments.

FIG. 4 illustrates an example extraction process by a data extraction module of FIG. 3 according to one or more embodiments. Referring to FIG. 4, in a non-limiting example, the data extraction module 20 may extract a liver function test result sheet 230 included in the medical data of a specific patient stored in the medical institution server as text data 240 of an attribute-value format.

Referring back to FIG. 3, in an example, the image calling module 30 may call or generate image data that models the position and shape of a specific body region by using the text data extracted by the data extraction module 20.

In an example, the image calling module 30 may call or generate image data by reflecting text data extracted in correspondence to a corresponding body region to body-modeling data modeling at least one of a plurality of predetermined body regions.

In an example, the image calling module 30 may call or generate body modeling data modeled according to a 2-dimensional or 3-dimensional coordinate system on the basis of a position and/or shape information according to the physical and anatomical structure of the entire human body.

In an example, the body-modeling data may be modeled as a set of point data having 2-dimensional or 3-dimensional position coordinates of the position and shape of each of a plurality of body regions classified according to the physical and anatomical structure of the entire human body included in standard human body data.

In addition, the body-modeling data may be 3D modeled to distinguish coordinate ranges for a plurality of body regions by using location and shape information of the musculoskeletal system, circulatory system, lymphatic system, digestive system, and nervous system according to the physical and anatomical structure of the entire human body.

In a non-limiting example, image data may refer to digitized data that visually express medical information such as people, organs, and diseases. Such image data may be Joint Photographic Experts Group (Jpeg), Graphics Interchange Format (GIF) Scalable Vector Graphic (SVG), Tag Image File Format (TIFF), Portable Network Graphics (PNG), Standard Triangulated Language (STL), OBJ, Filmbox (FBX), and Collabarative Design Activity (COLLADA), etc., and may be 2D or 3D data not mentioned here.

In addition, image data may include data representing bones, muscles, ligaments, arteries, veins, lymphatics, and nerves of a body object according to the physical and anatomical structure thereof on the basis of body data previously stored in 2D and 3D virtual spaces. The image data may be expressed in various coordinate systems such as a three-dimensional cartesian coordinate system, a three-dimensional oblique coordinate system, a cylindrical coordinate system, and a spherical coordinate system.

In addition, the image type data may be a programmatic object, and attributes-values according to the characteristics of the object may be already assigned to the object.

The data registration module 60 may store and register state information for each attribute of a specific body region extracted by the data extraction module 20 by matching the state information with image data called or generated in correspondence to the body region.

Figure 5:
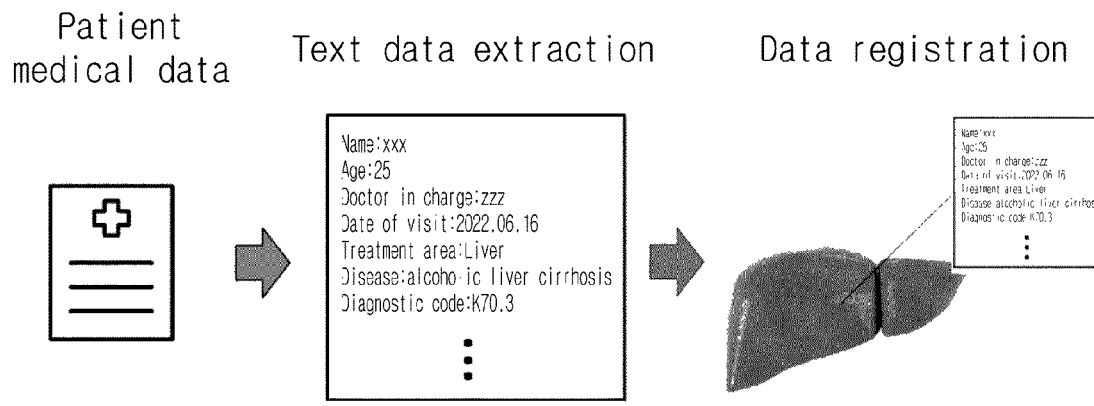
FIG. 5 illustrates an example registration process by a data registration module of FIG. 3 according to one or more embodiments.

FIG. 5 illustrates an example registration process by a data registration module of FIG. 3 according to one or more embodiments Referring to FIG. 5, in a non-limiting example, when the receiving module 10 receives medical data of a specific patient, the data extraction module 20 may extract text data of an attribute-value format for "Liver" included in the medical data, and the data registration module 60 may store and register the extracted text data by matching the extracted text data with image data called or generated in correspondence to "Liver".

Referring back to FIG. 3, in an example, the object calling module 40 may call image data called or generated by the image calling module 30 in the form of an object that can be edited in the form of a code.

The object calling module 40 may display the image data called or generated by the image calling module 30 as an object upon a user's request and display the image data on a screen.

In a non-limiting example, the object may be allocated in memory on the basis of what is defined in a class, and may be a variable, a data structure, function, and a method, etc. In the object, basic information and medical information about the whole body and parts of the body may be class-instantiated and stored in an attribute-value format.

In an example, the display part 70 may display an object called by the object calling module 40 on a user terminal screen.

The display part 70 may display the object on the user terminal screen according to a user's request, and may provide an interface for receiving a region selection command for at least one body region in a region on the screen corresponding to the object from a user.

When receiving the region selection command from a user through the interface, in an example, the display part 70 may display at least one body region included in a screen area according to the region selection command in any one format of a list format, a checkbox format, and a radio button format to receive user selection information.

In an example, a user may designate an editing range or select image data to be edited by using touch, click, and a GUI interface, etc. When a user designates the range, an image data within the range may be selected, and when a plurality of image data is selected, an interface helping the user to select a region of interest may appear.

Figure 6:
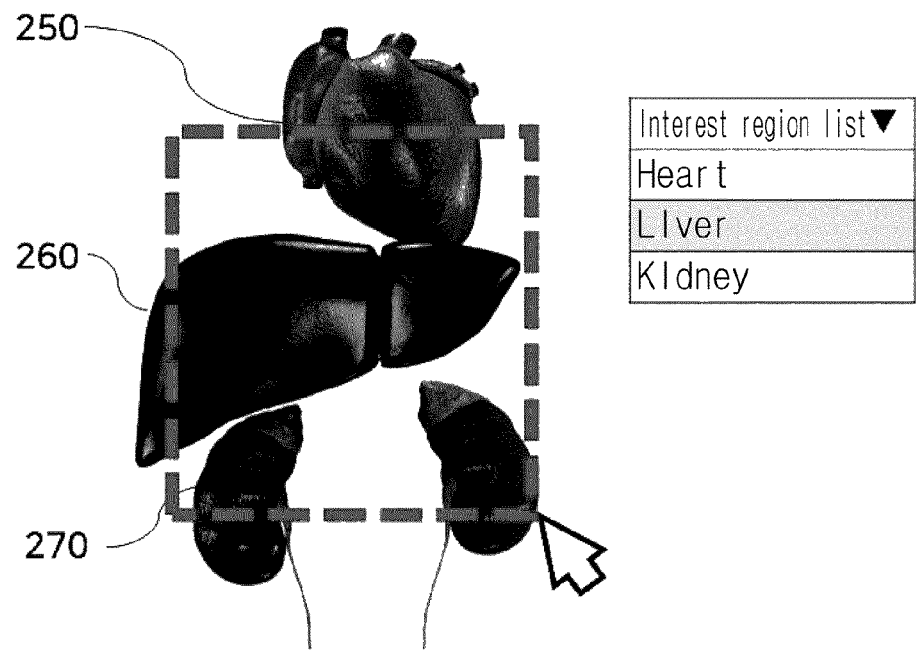
FIG. 6 illustrates an example display through an interface of a display part of FIG. 3 according to one or more embodiments.

FIG. 6 illustrates an example display through an interface of a display part of FIG. 3 according to one or more embodiments. Referring to FIG. 6, in a non-limiting example, the display part 70 may provide the user terminal screen with an interface displaying "an interest region list" for receiving a specific body region desired by a user among a plurality of image data 250, 260, and 270 selected by the user.

In an example when there is no state information for each attribute preregistered in correspondence to a body region selected by a user in the data registration module 60, as illustrated in FIG. 10A discussed in greater detail below, the display part 70 may display image data 210 corresponding to the body region and an input screen for inputting values for attributes (ALT, ALT, and SEVERITY) of the corresponding body region.

Referring back to FIG. 3, in an example, the interest region designation part 80 may designate a body region corresponding to selection information input by a user through the interface of the display part 70 as a user's region of interest.

In an example, a region of interest may refer to a region in objectified image data that a user intends to edit.

Figure 7:
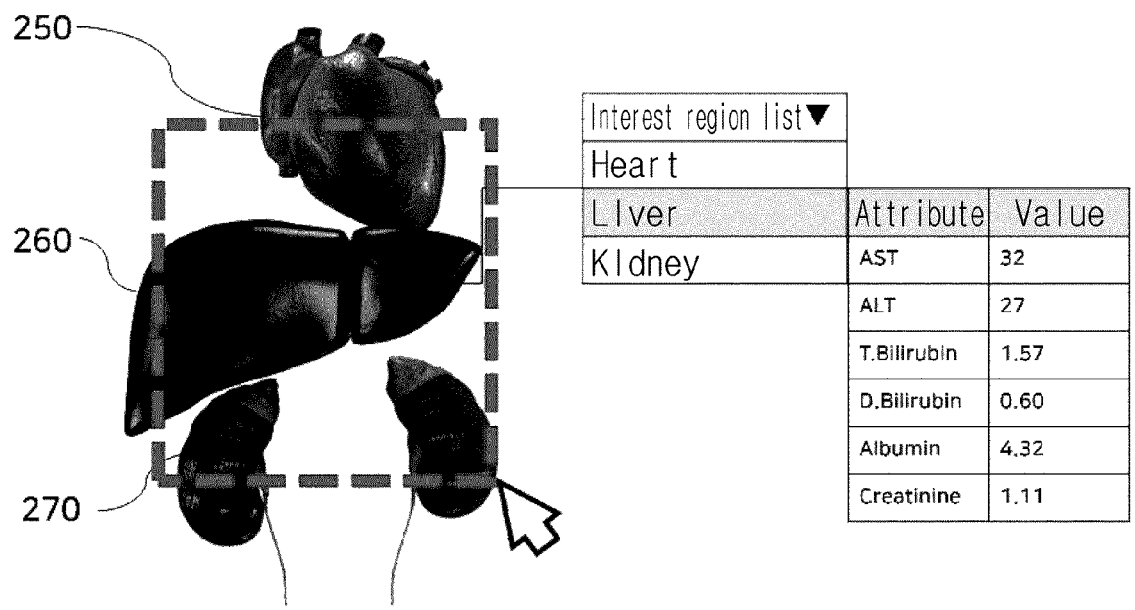
FIG. 7 illustrates an example case in which attributes and values are registered in liver image data included in the interest region list illustrated in FIG. 6 according to one or more embodiments.

FIG. 7 illustrates an example case in which attributes and values are registered in liver image data included in the interest region list illustrated in FIG. 6 according to one or more embodiments. Referring to FIG. 7, in a non-limiting example, when a user selects "Liver" when "the interest region list", as illustrated, for example, in FIG. 6, is displayed on the user terminal screen, the interest region designation part 80 may designate liver image data 260 as a region of interest.

In this case, the data registration module 60 may store and register the attribute-value formatted data extracted from the data extraction module 20 by matching the attribute-value formatted data with the liver image data 260.

In this case, the attribute-value formatted data may be stored by class-instantiating basic information about the whole body and body parts, and medical information.

Figure 8:
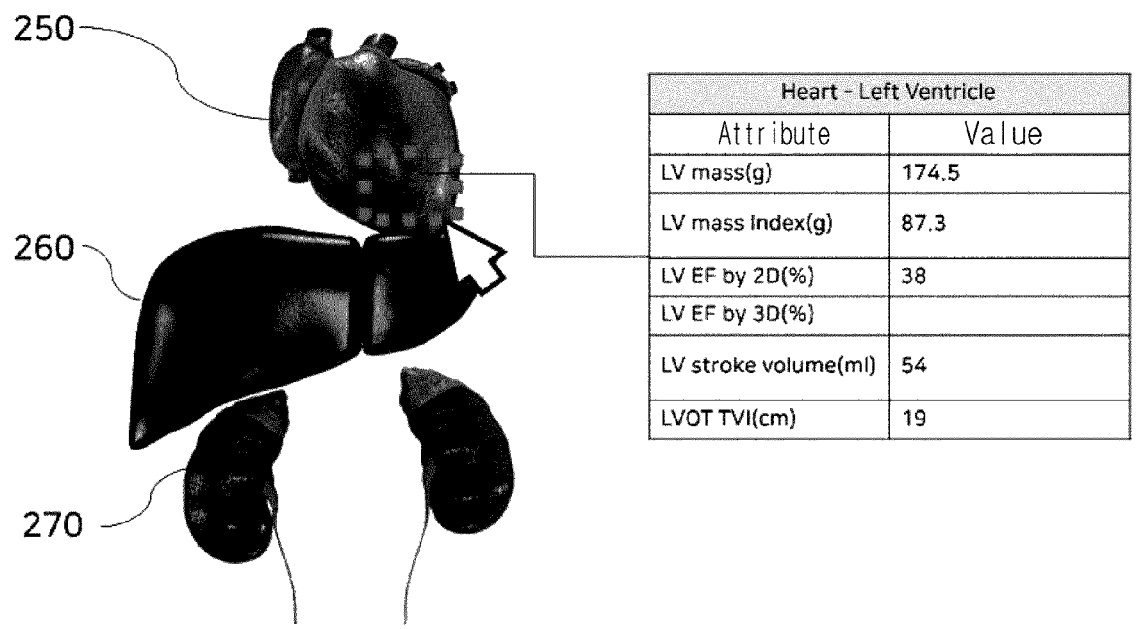
FIG. 8 illustrates an example case in which attributes and values of a local region are registered when the local region among heart image data included in the interest region list illustrated in FIG. 6 according to one or more embodiments.

FIG. 8 illustrates an example case in which attributes and values of a local region are registered when the local region among heart image data included in the interest region list illustrated in FIG. 6 according to one or more embodiments. Referring to FIG. 8, in a non-limiting example, in a case in which a user selects "Heart" in "the interest region list", as illustrated, for example, in FIG. 6, and heart image data is displayed on the screen, when a user selects a specific local region corresponding to the left ventricle of a heart structure among the heart image data, the interest region designation part 80 may designate the local region as a region of interest.

Referring back to FIG. 3, in an example, the data registration module 60 may store and register corresponding echocardiogram result data of an attribute-value format extracted from the data extraction module 20 by matching the corresponding echocardiogram result data with the heart image data and the local region information.

In an example, the control part 90 may control the code editing module 50 to objectify and program the region of interest designated by the interest region designation part 80.

In an example, the code editing module 50 may be configured to write codes to perform coding and calculation on classes, attributes, and values that a user intends to edit and calculate on the basis of object information called by the object calling module 40.

In an example, the code editing module 50 may write or edit programming codes for a body region corresponding to the called object according to user input and execute completed codes.

The code editing module 50 may write programming codes for a region of interest in the entire region of an object called by the object calling module 40 when a region of interest designated by the interest region designation part 80 exists.

FIG. 9 illustrates example code written by a code editing module of FIG. 3 according to one or more embodiments. Referring to FIG. 9, in a non-limiting example, according to a user's input, the code editing module 50 may write a code (CallDoctor) that requests calling a doctor when the AST value of the "LIVER" model exceeds 200, a code (CallDoctor) that requests calling a doctor when the ALT value exceeds 200, and code (BecomeObjectRed) that converts the color of the area of image data displayed on a screen to red when a severity value exceeds 50.

FIGS. 10A and 10B illustrate examples of a case in which image data and an interface are displayed on a user terminal screen by the display part of FIG. 3 according to one or more embodiments. In an example, when the "BecomeObjectRed" code of FIG. 9 is executed, as illustrated in FIGS. 10A and 10B, the area color of image data 210, 220 is changed from an original color (FIG. 10A) to a preset red color (FIG. 10B) and is displayed.

Referring to the case illustrated in FIG. 9, "ALT" (alanine aminotransferase) and "AST" (Aspartate Aminotransferase) are types of protein enzymes contained in some cellular tissues of the human body, and both values may be a measure of hepatocellular damage. Additionally, "severity" may be an attribute representing the degree of severity.

In this case, a code written by the code editing module 50 is not limited to the above-described embodiment, and a user of the present disclosure may write a code in a desired manner and apply the code to medical data-related programming.

In an example, the code editing module 50 may write a code that performs a group calculation using attribute values of at least two body regions.

In a case in which a programming code input by a user includes an attribute value for a specific attribute of each of at least two body regions and an operator targeting the attribute value, the code editing module 50 may perform a group calculation of the attribute value according to whether at least one of a range or data type of the attribute and a unit of the attribute value matches.

Figure 11:
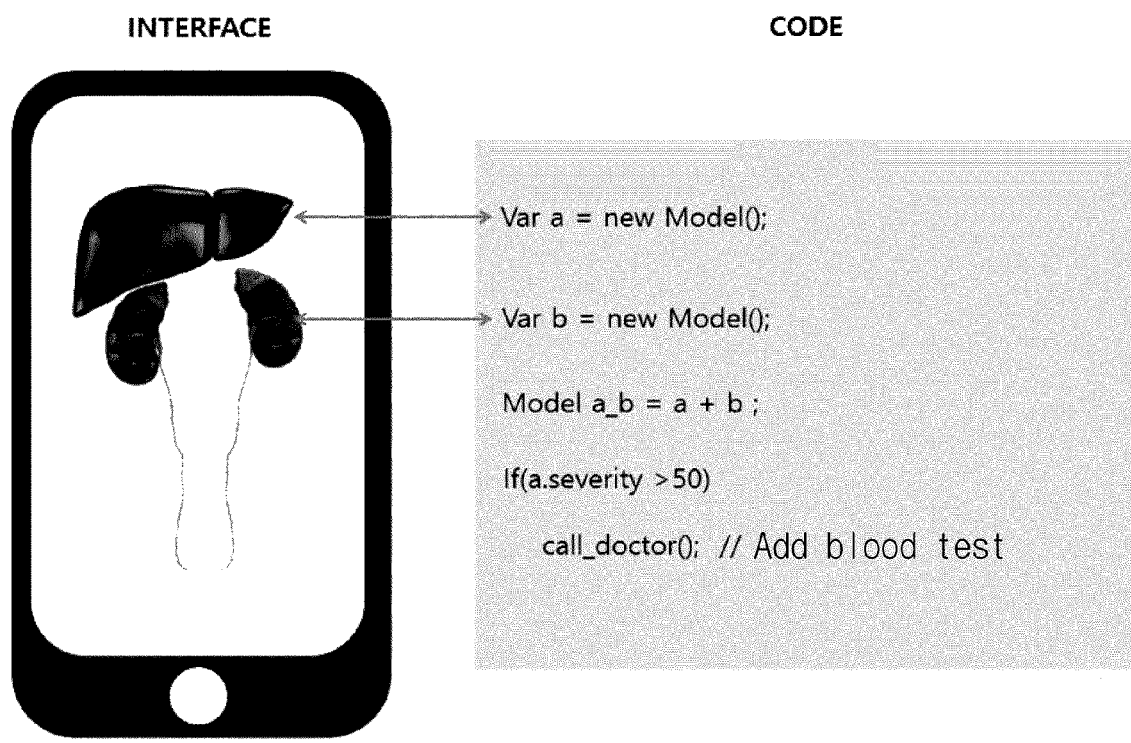
FIG. 11 illustrates an example of a case in which a group calculation between objects is performed on the basis of the codes written by the code editing module of FIG. 3 according to one or more embodiments.

FIG. 11 illustrates an example of a case in which a group calculation between objects is performed on the basis of the codes written by the code editing module of FIG. 3 according to one or more embodiments. Referring to FIG. 11, in a non-limiting example, when trying to perform addition calculation on model a and model b, in a case in which an added severity exceeds 50, an action requesting to call a doctor "call doctor" may be executed and a comment that a blood test can be added may be added. In this example, a user may edit image data by designating at least one region of interest.

A method for computing medical data according to the present disclosure will be described with reference to FIGS. 1 and 2 on the basis of description about components illustrated in FIGS. 3 to 11 described in greater detail above.

FIG. 1 illustrates an example method according to one or more embodiments. Referring to FIG. 1, in a non-limiting example, a method 100 for computing medical data may include receiving medical data from the medical institution server at S100, extracting text data for at least one body region from the medical data at S200, calling or generating image data modeling a position and a shape of the body region by using extracted text data at S300, calling image data, which may be called or generated, as an object at S400, and writing or editing a programming code for the body region corresponding to a called object according to user input at S500.

Figure 2:
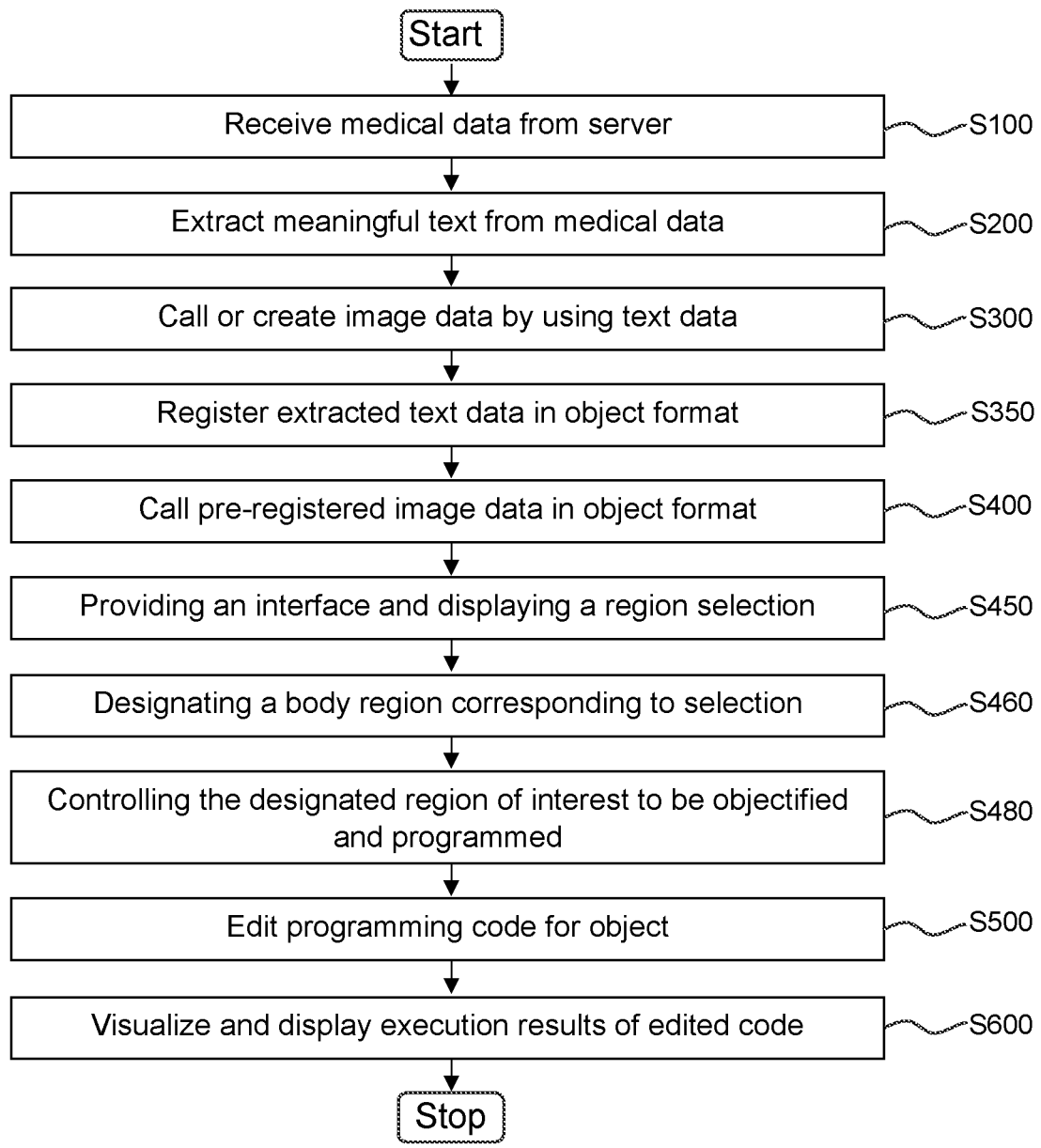
FIG. 2 illustrates an example method according to one or more embodiments.

FIG. 2 illustrates an example method according to one or more embodiments. Referring to FIG. 2, in a non-limiting example, method 200 for computing medical data may include all of the aforementioned S100 to S500 as illustrated above with respect to FIG. 1, and in the extracting at S200 of method 200, the state information of the attribute-value format from text data extracted in correspondence to each body region may be classified and extracted for each attribute of the body region. In an example, the method 200 may include storing and registering the state information for each attribute by matching the state information with image data called or generated in correspondence to the body region at S350 between S300 and S400.

In an example, the method 200 may include displaying the object on the user terminal screen according to a user request and providing an interface for receiving, from a user, the region selection command for at least one body region in an area on the screen corresponding to the object at S450 between S400 and S500.

In an example, at S450, when the region selection command is input by a user through the interface, the at least one body region included in the screen area according to the region selection command may be displayed in any one format of a list format, a check box format, and a radio button format to receive user selection information. In this case, the method 200 may include designating a body region corresponding to the selection information input by a user as a region of interest of the user at S460, and controlling the designated region of interest to be objectified and programmed at S480 between S450 and S500.

In an example, the method 200 may include visualizing and displaying the execution result of the edited code at S600 after S500.

Referring to methods 100 and 200 of FIGS. 1 and 2, respectively, the progress and/or the order of the steps of the present disclosure is not limited to the steps of the above embodiment, and image data may be edited only with attributes-values of classes pre-stored in the image data.

Figure 12:
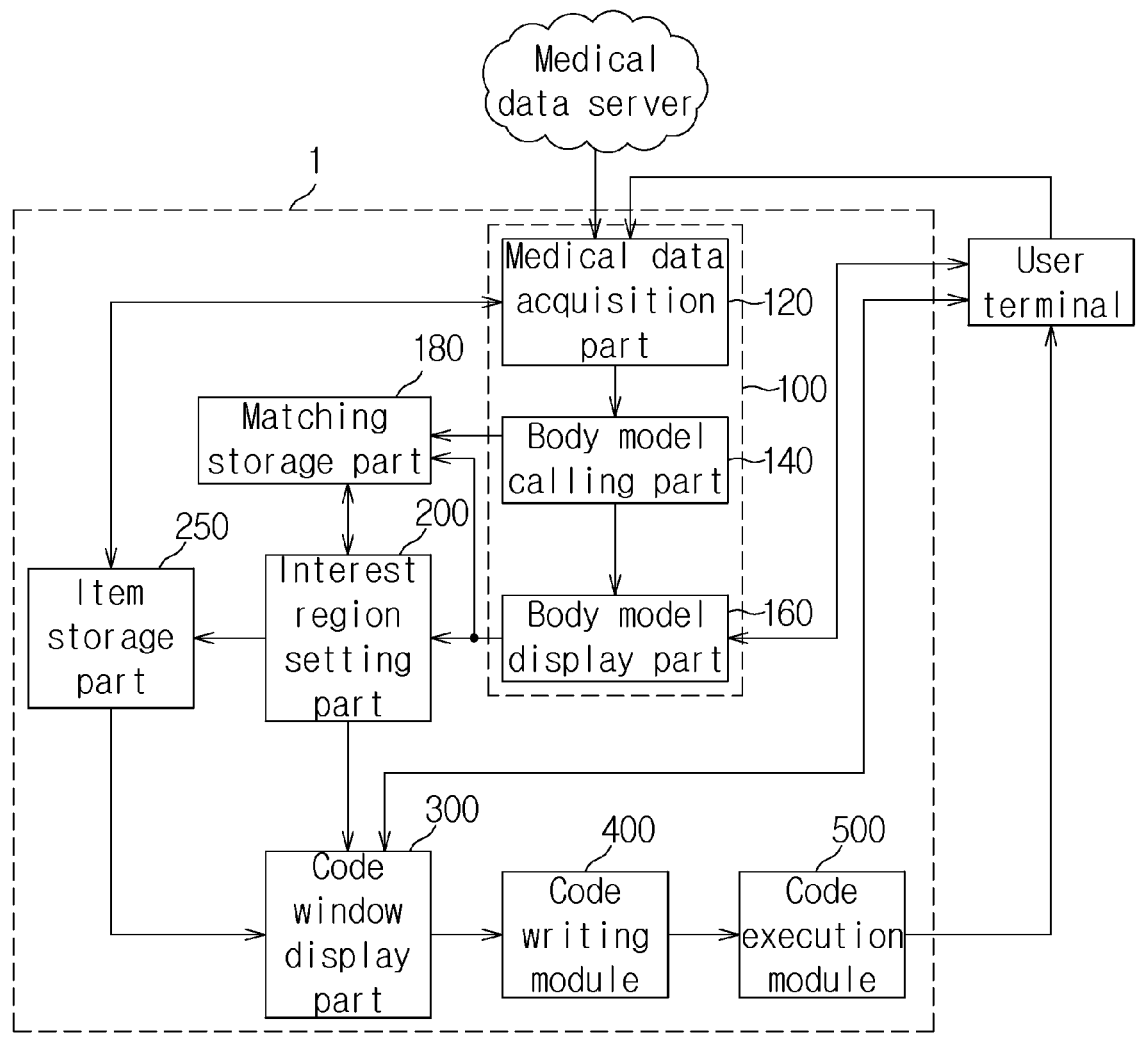
FIG. 12 illustrates an example configuration of the system according to one or more embodiments.

FIG. 12 illustrates an example configuration of the system according to one or more embodiments. Referring to FIG. 12, in a non-limiting example, a system 1200 for computing medical data may include a body model display module 100, an interest region setting part 200, an item storage part 250, a code window display part 300, a code writing module 400, and a code execution module 500.

In an example, the item storage part 250, a matching storage part 180, and the interest region setting part 200 illustrated in FIG. 12 may respectively correspond to the data extraction module 20, the data registration module 60, and the interest region designation part 80, which are described sequentially above, of the system for computing medical data (shown in FIG. 3) according to one or more examples.

In addition, the combination of all of the code window display part 300, the code writing module 400, and the code execution module 500 illustrated in FIG. 12 may correspond to the code editing module 50 of the system for computing medical data (shown in FIG. 3) according to one or more non-limiting examples.

The body model display module 100 may play a role of calling or generating, and storing a body model modeled for the whole body region of the human body on the basis of medical data, and displaying the model on the screen upon user request.

The body model display module, in a non-limiting example, 100 may include a medical data acquisition part 120, a body model calling part 140, and a body model display part 160.

Here, in an example, the body model display module 100 may perform the same function as the function of some components of the system for computing medical data (shown in FIG. 3). In an example, the medical data acquisition part 120 may correspond to the receiving module 10 of FIG. 3, the body model calling part 140 may correspond to the image calling module 30 of FIG. 3, and the body model display part 160 may correspond to the display part 70 of FIG. 3, and the body model may correspond to image data called or generated by the image calling module 30.

The medical data acquisition part 120 may perform data communication with a medical data server to obtain a plurality of patient-specific medical data pre-stored in the corresponding server.

The medical data server may be linked in advance with a plurality of medical institutions using the electronic medical record (EMR) system, the order communication system (OCS), the hospital information system (HIS), and the clinical information system (CIS), etc., and collects and manages medical data of the corresponding medical institutions in an integrated manner.

In an example, the detailed description of medical data, medical images, and diagnostic record information based thereon have been described above in greater detail, for example, in the description of the receiving module 10 of the system for computing medical data with reference to FIGS. 3 to 11, and thus will be omitted.

In an example, the body model calling part 140 may call or generate a body model modeled according to a 2-dimensional or 3-dimensional coordinate system on the basis of position and shape information according to the physical and anatomical structure of the entire human body.

In an example, the body model calling part 140 may call or generate modeling data of a body model in which the position and shape of each of a plurality of body regions classified according to the physical and anatomical structure of the entire human body included in standard human body data are modeled as a set of point data having 2-dimensional or 3-dimensional position coordinates.

In an example, the body model calling part 140 may be to call or generate the body model by pertaining 3D modeling to distinguish coordinate ranges for a plurality of body regions by using position and shape information of the musculoskeletal system, circulatory system, lymphatic system, digestive system, and nervous system according to the physical and anatomical structure of the entire human body.

In an example, the body model may be a representation of bones, muscles, ligaments, arteries, veins, lymphatics, and nerves, etc. of a body object according to the physical and anatomical structure thereof on the basis of standard human body data previously stored in a three-dimensional virtual space. For example, the body model may be expressed in various coordinate systems such as a three-dimensional cartesian coordinate system, a three-dimensional oblique coordinate system, a cylindrical coordinate system, and a spherical coordinate system.

In an example, the body model display part 160 may display an interface for receiving at least one of a plurality of body regions corresponding to the body model on the screen of the user terminal when the user requests screen display.

Figure 15:
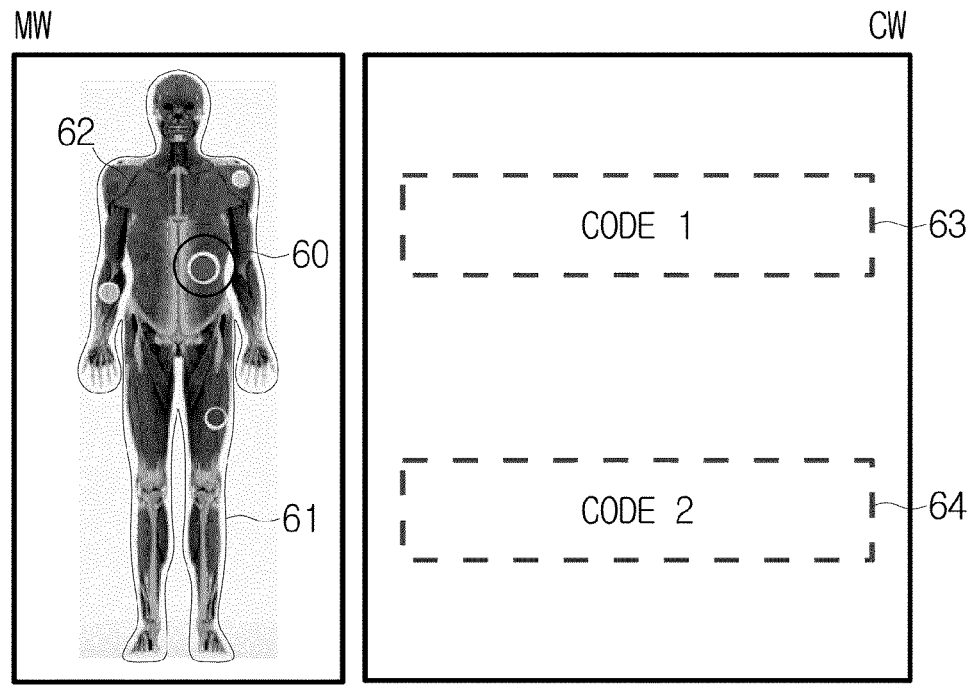
FIG. 15 illustrates an example input code area of a code window displayed on a screen by a code window display part of FIG. 12 according to one or more embodiments.

In an example, the body model display part 160 may output the body model on the screen of the user terminal that has transmitted the request in response to the user's screen display request. FIG. 15 illustrates an example input code area of a code window displayed on a screen by a code window display part of FIG. 12 according to one or more embodiments. Referring to FIG. 15, in a non-limiting example, the body model display part 160 may display a body model display window MW in the form of an interface for receiving, from a user, the region selection command 60 for at least one of a plurality of body regions in a first area corresponding to the inner area 62 of the boundary 61 of the body model of the output screen on the user terminal screen.

In an example, the body model display window MW may receive the region selection command 60 based on region coordinates of the body model on the basis of a GUI-based input event by a user or a touch gesture input by a user in the first area 62 on the screen corresponding to the body model.

In an example, when the body model display part 160 is executed in a state in which the region selection command can be input in the body model display window MW, the body model display part 160 may receive the region selection command 60 according to the selection of GUI including a mouse drag and drop, a radio button, and a check box, etc. by a user.

In an example, when the body model display part 160 receives the selection information according to the selection of GUI including a mouse drag and drop, a radio button, and a check box, etc. by a user through the body model display window MW, the body model display part 160 may receive at least one body region belonging to a coordinate range corresponding to the selection information as a region of interest according to the region selection command 60.

In an example, when the body model display part 160 is executed in a state in which the region selection command can be input in the body model display window MW, the body model display part 160 may receive the region selection command 60 on the basis of a region corresponding to coordinates of points, lines, and planes input according to a gesture method using a user's touch.

In an example, in a state in which text data for the name of at least one body region belonging to a plurality of body regions constituting the body model, a disease name, a diagnosis name, and a code type related to the corresponding body region are matched and stored for each body region in advance, when at least one text datum is received as keyword information by a user through the body model display window MW, the body model display part 160 may receive a body region corresponding to the text datum as a region corresponding to the region selection command 60.

In an example, the interest region setting part 200 may preset at least one body region according to the region selection command input by a user through the body model display window MW of the body model display part 160 as a region of interest.

In an example, in a case in which a user selects and inputs two or more body regions through the body model display window MW, the interest region setting part 200 may preset selected and input body regions as regions of interest, and may individually distinguish and preset each of the regions of interest by matching each of the regions of interest with identification information assigned in correspondence to region coordinates for each of the body regions and storing the regions of interest.

Figure 14:
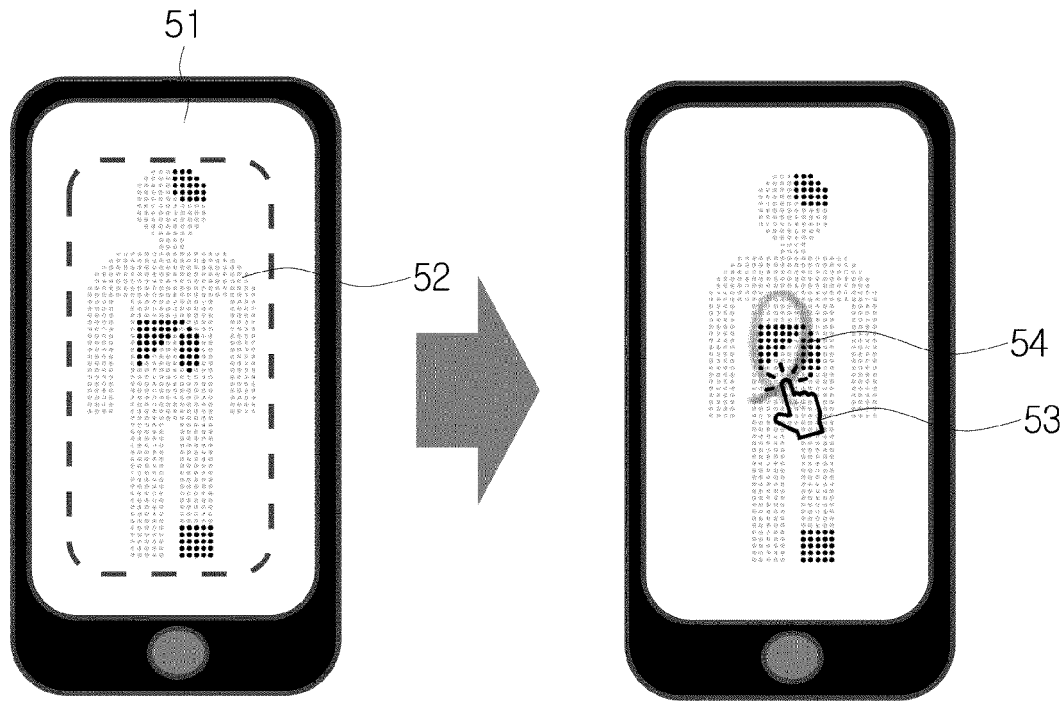
FIG. 14 illustrates an example process in which a region of interest is preset according to a user's selection input through a body model display window of a body model display part of FIG. 12 according to one or more embodiments.

FIG. 14 illustrates an example process in which a region of interest is preset according to a user's selection input through a body model display window of a body model display part of FIG. 12 according to one or more embodiments. Referring to FIG. 14, in a non-limiting example, in a case in which a body region corresponding to the position of the liver is selected by a user's touch input 53 in an area 52 on a screen corresponding to a body model displayed on a user terminal screen 51 through the body model display window MW, the interest region setting part 200 may preset the liver region 54 corresponding to the position selected by the user as the region of interest ROI.

In an example, the body model display module 100 according to the present disclosure may further include the matching storage part 180 which classifies and stores a body model for each patient when a body model for each patient based on each of a plurality of patient-specific medical data pre-stored in the medical data server is called or created by the body model calling part 140.

When a region of interest ROI for a body model corresponding to a specific patient is preset by the interest region setting part 200 according to the reception of display request for medical data of the specific patient is received from a predetermined user terminal through the body model display part 160, in an example, the matching storage part 180 may match at least one of information on the preset region of interest and identification information of the user terminal with the corresponding body model and store the at least one.

In an example, the item storage part 250 may extract a plurality of items corresponding to a discrimination index for the health state of a body part or organ corresponding to the region of interest ROI from medical data pre=stored in correspondence to a specific patient and item values corresponding to the items in the form of text, and may store the plurality of items and item values for each item.

In an example, the medical data may be a data foam of a health record document concerning a patient's health condition, and may include a medical data set including a combination of a plurality of items used as an indicator for reading the health condition of a body region corresponding to each of a plurality of body parts or organs constituting the patient's entire body and a plurality of body data consisting of item values corresponding to each of the items.

In an example, the item storage part 250 may identify and recognize item names for each of items included in a medical dataset corresponding to the medical data through a library pre-built to recognize attributes of a data set according to a predefined medical terminology system, and then may store information for each of the items in the foam of "item name-item value".

In an example, the item storage part 250 may recognize and extract items included in a medical diagnosis or examination of at least one body part or organ located inside the region of interest on the basis of the region coordinates of the region of interest ROI and medical documents in which result values for each item are recorded as a medical data set. In addition, the item storage part 250 may store text values corresponding to each item included in the extracted data set as "item name text" and may store text values corresponding to result values for each item as "item value text".

In an example, in a case in which a liver region is included inside a region of interest ROI preset by the interest region setting part 200, a document recording result of a liver function test may be recognized as a medical data set. In this case, the item storage part 250 may recognize alanine aminotransferase (ALT), alkaline phosphatase (ALP), aspartate aminotransferase (AST), bilirubin, albumin, total protein, gamma-glutamyltransferase (GGT), lactate anhydrase (LDH), and prothrombin time (PT), etc., which correspond to the index items of the liver function test, as a plurality of items so as to store text values corresponding to the corresponding items as "item name text", and may recognize a result value for each item as an item value for the corresponding item so as to store a corresponding text value as "item value text".

In an example, the code window display part 300 may display, on the user terminal screen, an interface for receiving, from a user, a code for medical monitoring of a body model corresponding to a target patient to be monitored by the user or a region of interest.

In an example, the code window display part 300 may display a code window CW in the foam of an interface for receiving, from a user, a selection command or text input value for at least one class, class attribute, item, and item value corresponding to the body model or the region of interest, on the screen of the corresponding terminal, on the basis of class information predefined by corresponding to each of the body model and a plurality of body regions stored in the matching storage part 180 by corresponding to a target patient and item information based on medical data of the corresponding patient.

Referring to FIG. 15, in a non-limiting example, the input area of the code window CW may receive programming codes 63 for variables based on class, class attribute, item, and item value corresponding to the region of interest ROI from a user, or may receive a code 64 for a calculation function and an action execution function using the corresponding variables or for from a user.

Referring to FIG. 12, in a non-limiting example, the code writing module 400 may specify at least a portion of a body model and a region of interest as a target region to be programmed by a user according to a user's input through the code window CW of the code window display part 300, and serves to write a programming code for the target region.

Figure 13:
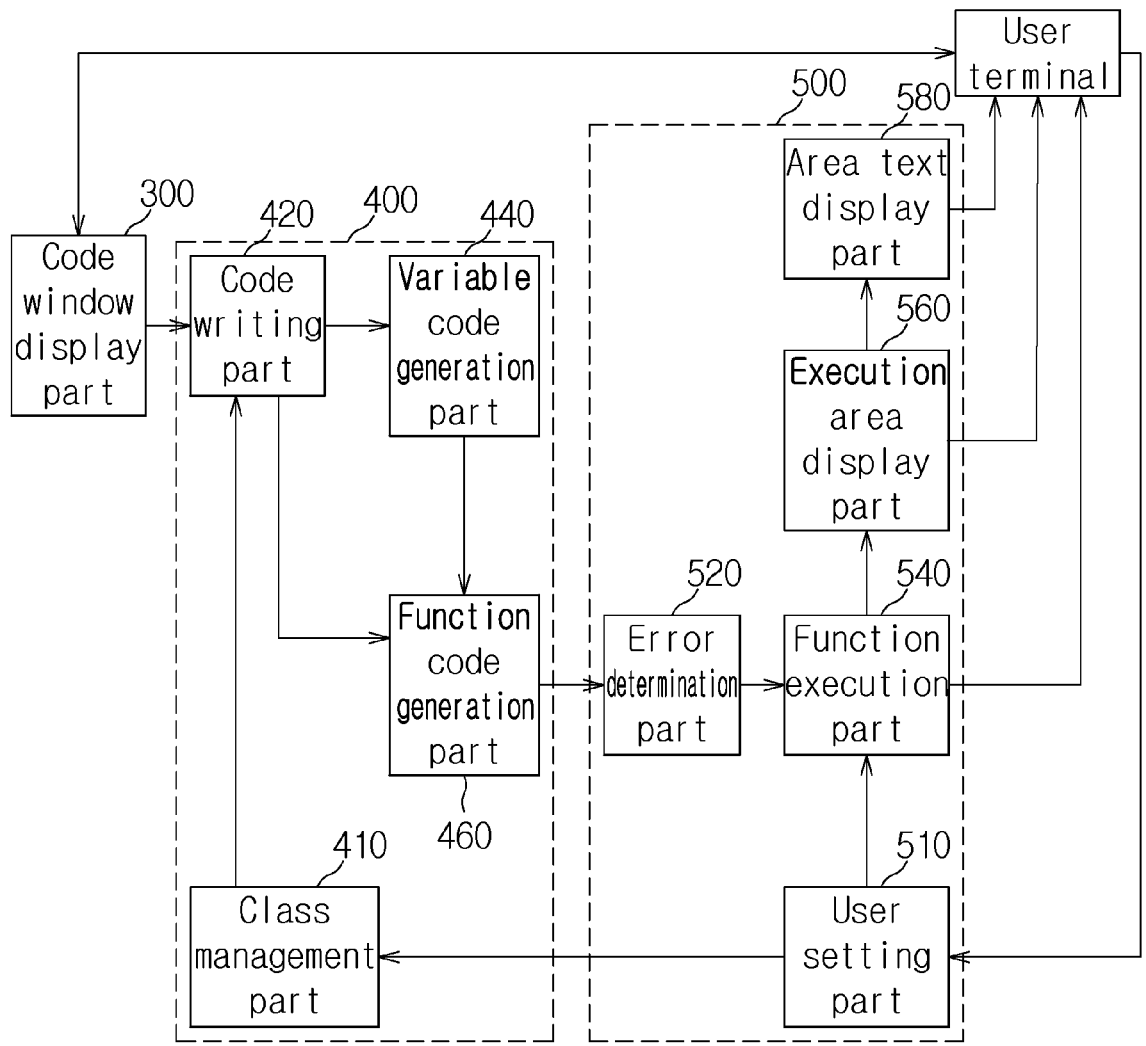
FIG. 13 illustrates an example internal configuration of each of a code writing module and a code execution module of FIG. 12 according to one or more embodiments.

FIG. 13 illustrates an example internal configuration of each of a code writing module and a code execution module of FIG. 12 according to one or more embodiments. Referring to FIG. 13, in a non-limiting example, the code writing module 400 may include a class management part 410, a code writing part 420, a variable code generation part 440, and a function code generation part 460.

In an example, the class management part 410 may divide and store texts for a class name for each class and a plurality of class attribute names belonging to a corresponding class on the basis of upper class information predefined for an upper class corresponding to the body model and lower class information predefined for a lower class corresponding to each of a plurality of body regions.

In an example, the upper class information may be predefined name of the body model, and the lower class information may be a predefined name for each region corresponding to each of a plurality of body regions constituting the body model, a predefined name of an object corresponding to a body part or organ belonging to each body region, and a predefined attribute name for a medical condition of the object.

For example, "MODEL", which is text indicating the class name of an upper class corresponding to a body model, may be stored as the upper class information, and "LIVER", which is a text indicating the class name of a lower class corresponding to a liver region, which is one of a plurality of body regions, and "liver function test value", "liver color", and "liver size", which are texts indicating the attribute names of the corresponding class, may be stored as the lower class information.

In this case, a number of upper classes may be generated in correspondence to the number of body models, a number of lower classes may be generated in correspondence to the number of body regions constituting a corresponding body model for each body model or the number of body parts or organs belonging to each of a plurality of body regions, and threshold values for attributes belonging to the upper classes or lower classes may be in a predetermined state.

In an example, the code writing part 420 writes programming codes for at least one class, class attribute, item, and item value corresponding to a body model or a region of interest according to a user's selection or text input through the code window CW of the code window display part 300.

On the basis of a user input through the code window CW, in an example, the code writing part 420 may write programming codes by using a combination of class information corresponding to a body model or region of interest, an automatic writing code selected and written according to the user input among a plurality of character strings extractable from a plurality of items included in the body data corresponding to the region of interest, a user input code according to the user input, and a symbol code for displaying text values included in the items and item values.

On the basis of a user's selection or text input through the code window CW, in an example, the code writing part 420 may write programming codes defining attribute values for target attributes of a specific target region by combining a string code ccl representing a class that specifies at least one subclass corresponding to the region of interest as a target region, a sign code (.) for calling and displaying attributes corresponding to the subclass, a string code cpr representing an attribute that specifies any one of displayed attributes as a target attribute, an equal sign code (=) for allocating an attribute value for the target attribute, and a string code cpv representing an attribute value for allocating and displaying an attribute value for the target attribute.

In summary, first, in a case in which there is one subclass corresponding to the region of interest when the code writing part 420 writes a string code ccl representing a class, a string corresponding to the text of the class name of the subclass may be directly called and be added as a string code ccl representing the class to a first input position at which the string can be input in the code window CW.

In addition, in a case in which there is a plurality of subclasses corresponding to the region of interest when the code writing part 420 writes a string code ccl representing a class, a class selection interface CS for receiving one of a plurality of subclasses may be displayed at a first input position at which a string can be input in the code window CW, and a string corresponding to the text of the class name of the subclass selected by a user through the class selection interface CS may be called and added as a string code ccl representing the class to the corresponding input position.

Next, in a case in which a sign code (.) is entered in the next string position of the string code ccl representing the class when the code writing part 420 writes a string code cpr representing an attribute, an attribute selection interface (PS) for receiving any one of a plurality of attributes belonging to a subclass corresponding to a called class name may be displayed at a string position next to the sign code (.), and a string corresponding to the text of the class attribute name of an attribute selected by a user through the attribute selection interface PS may be called and added as a string code cpr representing the attribute to the corresponding string position.

In an example, the code writing part 420 may select at least one matching attribute by a text comparison of a plurality of items included in body data corresponding to a region of interest with a plurality of attributes belonging to a subclass corresponding to the class name called according to the input of the sign code (.), and then may display the attribute selection interface PS at the next string position of the string code ccl representing the class so that one of the selected attributes is selected by a user.

Next, in a case in which an equal sign code (=) for allocating an attribute value according to a user input is input at the next string position of the string code cpr representing the attribute when the code writing part 420 writes a string code cpv representing an attribute value, on the basis of the presence or absence of an item value of an item after the corresponding item matching a called class attribute name is found among a plurality of items included in body data corresponding to a region of interest, in an example, one of the item value, a preset initial value, and a user's input value may, as the attribute value of a class attribute based on the string code cpr representing the attribute, be displayed at the next string position of the equal sign code (=).

In this case, in an example, when the item value exists, the code writing part 420 may automatically assign the item value as the attribute value of the class attribute based on the string code cpr representing the attribute, and may display an automatically assigned attribute value VA at the next string position of the equal sign code (=).

In an example, when the item value does not exist, the code writing part 420 may allocate a preset initial value as the attribute value of the class attribute based on the string code cpr representing the attribute, and may display the initial value at the next string position of the equal sign code (=) or provide an input interface (VI) for receiving a value from a user to assign the attribute value according to a user's input.

Figure 16:
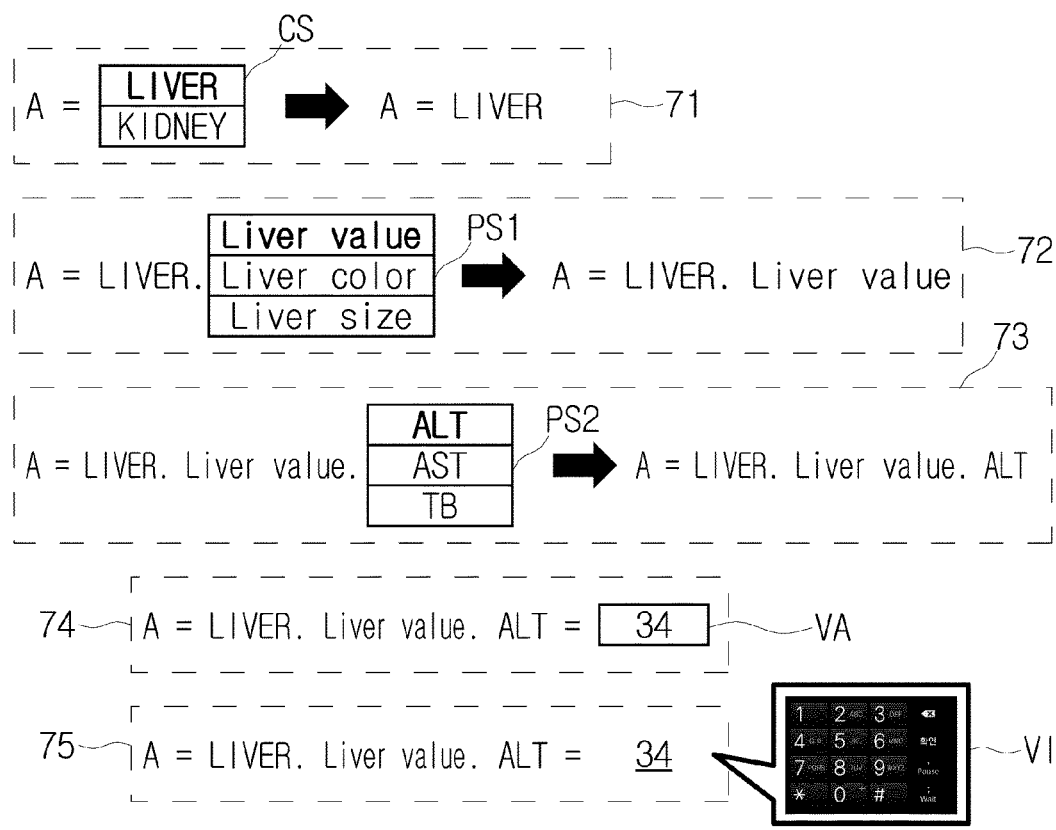
FIG. 16 illustrates an example process in which programming codes are written according to a user's selection or text input through the code window by a code writing part of FIG. 13 according to one or more embodiments.

FIG. 16 illustrates an example process in which programming codes are written according to a user's selection or text input through the code window by a code writing part of FIG. 13 according to one or more embodiments. Referring to FIG. 16, in a non-limiting example, a process in which programming codes are written by the code writing part 420 will be described in an example order.

First, in an example at operation 71, when there is a plurality of subclasses LIVER and KIDNEY corresponding to the region of interest ROI, the class selection interface CS is displayed at a first input position in which a string can be entered in the code window CW, and through this, a string "LIVER" corresponding to the text of the class name of a subclass LIVER selected by a user may be called and added as the string code ccl representing the class to the corresponding input position.

Second, in an example at operation 72, when the sign code (.) is input at the next string position of the string code LIVER representing the class, an attribute selection interface PS1 for selecting one of a plurality of top-level attributes (liver function value, a liver color, and liver size) belonging to the subclass LIVER corresponding to the called class name according to a user's input may be displayed at the next string position of the sign code (.), and through this, a string ("liver function value") corresponding to the text of the class attribute name of the top-level attribute (liver function value) selected by a user may be called and added as a string code cpr1 representing the top-level attribute to the corresponding string position.

Third, in an example at operation 73, when the sign code (.) is input at the position of the next string of the string code (liver function value) representing the top-level attribute, an attribute selection interface PS2 for selecting one of a plurality of next-level attributes (ALT, AST, and TB) belonging to the subclass attribute (liver function value) corresponding to the called class attribute name according to a user input may be displayed at the next string position of the sign code (.), and through this, a string "ALT" corresponding to the text of the class attribute name of an next-level attribute (ALT) selected by a user may be called and may, as a string code cpr2 representing a second-level attribute, be added to the corresponding string position.

Fourth, in an example at operation 74, when an equal sign code (=) is input to the next string position of a string code ALT representing the second-level attribute, in a case in which an item matching a called class attribute name ALT is found and an item value of the corresponding item exists, the item value is automatically assigned as an attribute value of a class attribute based on the second attribute code, and the automatically assigned attribute value VA may be displayed at the next string position of the equal sign code (=). In contrast, in an example, as illustrated in operation 75, when the item value does not exist, the attribute value may be assigned according to a user's input "34" by providing an input interface VI for receiving a value from a user at the next string position of the equal sign code (=).

On the other hand, the code writing part 420 may write a new programming code for each line when a line break input is received from a user through the code window CW. Through this, programming codes defining attributes and attribute values of each of a plurality of target regions belonging to a region of interest ROI may be divided on the basis of a line break and written at once.

Referring to FIG. 13, in an example, variable code generation part 440 may generate a variable code that declares a class name, class attribute name, and variables for attribute values, which correspond to a target region, for the corresponding class on the basis of a programming code written according to a user's input through the code window CW.

In an example, the variable code generation part 440 may designate each of string codes ccl, cpr, and cpv representing the class, attribute, and attribute value created by the code writing part 420 as each variable and generate a variable code encoding the variable.

In an example, the variable code generation part 440 may generate a plurality of variable codes corresponding to the number of lines by dividing all programming codes written according to a user's input through the code window CW in units of line breaks.

In an example, the function code generation part 460 may receive, from a user, a string function that combines variables declared by the variable codes through the code window CW and four arithmetic operators or logical operators and may generate a function code that declares the function for a corresponding class.

In a case in which a variable for a string code cpr representing an attribute is entered at a position before or after the four arithmetic operators or logical operators, the function code generation part 460, in an example, may apply an attribute value assigned in correspondence to the input variable as an operand of the operators to generate a function code that may encode a function to perform four arithmetic operations or logical operations according to the corresponding operand.

In an example, when a plurality of variable codes are generated by the variable code generation part 440, the function code generation part 460 may generate the function code to perform a group calculation using attribute values of attributes of each of a plurality of subclasses corresponding to the variable codes.

FIG. 17 illustrates an example of variable codes and function codes generated respectively by a variable code generation part and a function code generation part of FIG. 13 according to one or more embodiments. Referring to FIG. 17, in a non-limiting example, the variable code generation part 440, as described above with respect to FIG. 13, may generate a variable code 83 that declares variables for each of a string code "Liver_AST_Value" representing the first attribute, a string code "Liver_ALT_Value" representing the second attribute, and a string code "Total_Bilirubin" representing the third attribute for a subclass code "Model_name" belonging to an upper class code "Model", and the function code generation part 460 may call (input) attribute values assigned in correspondence to each of the first attribute, the second attribute, and the third attribute, and may generate a function code 84 for a function performing a logical operation that compares the attribute values with preset threshold values "200", "200", "1.0f".

Referring to FIG. 13, in an example, the code execution module 500 may execute a corresponding code on the basis of whether or not there is an error in a programming code written by the code writing module 400 and to execute a predefined action or display function.

In a non-limiting example, the code execution module 500 may include an error determination part 520, a function execution part 540, an execution area display part 560, an area text display part 580, and a user setting part 510.

In an example, the error determination part 520 may determine whether or not the function code is erroneous depending on whether four arithmetic operations or logical operations are possible for attributes and attribute values of a class corresponding to at least one variable included in the function code in the function code generated according to a user's input through the code window CW.

In an example, the error determination part 520 may determine a case in which the range or data type of a class attribute corresponding to at least one variable included in the function code generated according to a user's input through the code window CW mismatches, or a case in which the unit or dimension of an attribute value for the class attribute mismatches as an error state.

When it is determined that there is no error in the function code, the function execution part 540 may, in an example, execute the action execution function predefined by a user according to the rules of a programming language on the basis of the result of performing the four arithmetic operations or logical operations according to the operators included in the function code by using the variables declared by the variable code.

When the action execution function is executed by the function execution part 540, the execution area display part 560 may change a color of an execution area corresponding to a body region corresponding to a class based on the corresponding function and displays the changed color on a screen.

Figure 18:
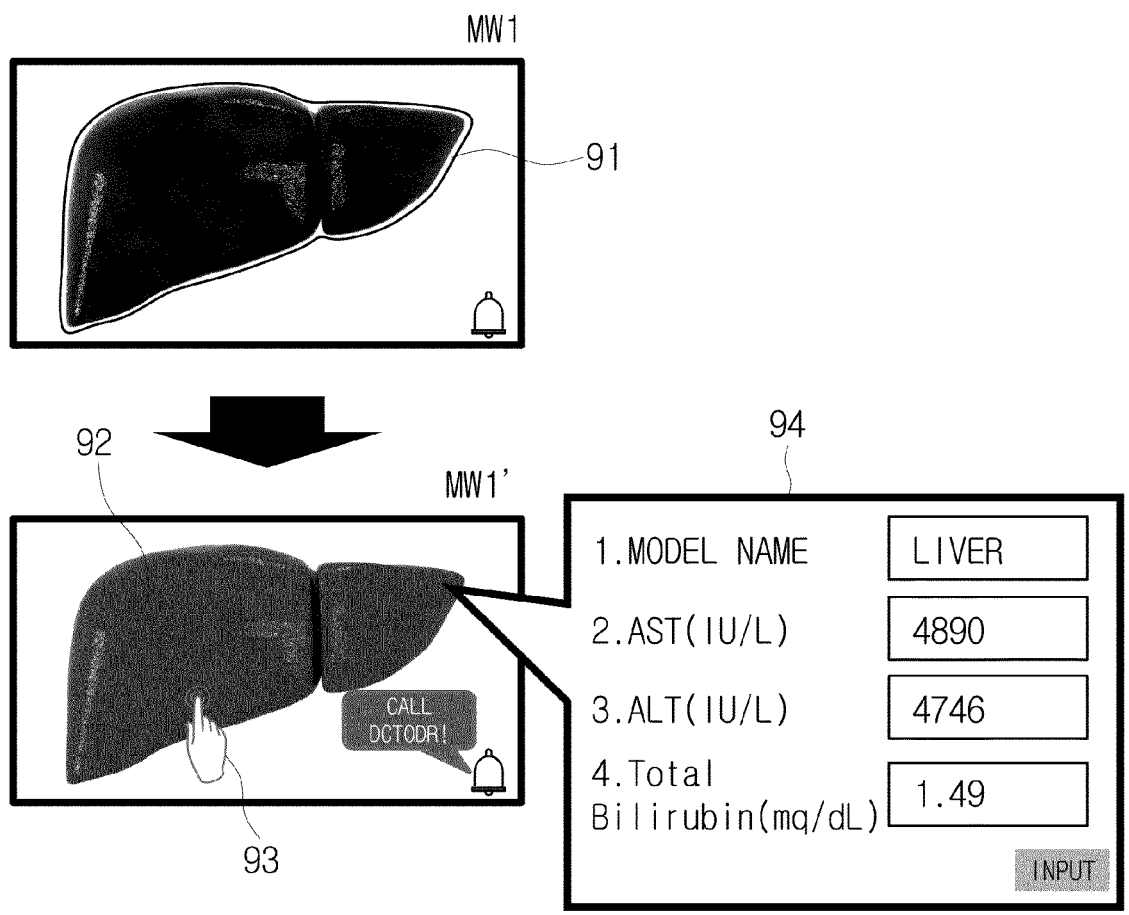
FIG. 18 illustrates an example result screen when an action execution function is executed by a function execution part of FIG. 13 according to one or more embodiments.

FIG. 18 illustrates an example result screen when an action execution function is executed by a function execution part of FIG. 13 according to one or more embodiments. Referring to FIG. 18, in a non-limiting example, when the action execution function is executed, the execution area display part 560 may change the pixel values of pixels located in or around a boundary line 91 of at least one body region corresponding to the class belonging to the function code that is the basis of the action execution function in a first area MW1 on the screen of a terminal and may display the pixel values on the screen.

In an example, the area text display part 580 may display information about the class or class attribute of the corresponding area on the screen during a user's input to the execution area whose color is changed by the execution area display part 560.

In an example, when a user's input 93 is generated for a second area 92 corresponding to the pixels whose pixel values are changed in a first area MW1' on the terminal screen according to the execution of the action execution function, the area text display part 580 may display a text value for a class or class attribute belonging to a function code, which may be the basis of the action execution function, in the foam of a message 94 on the screen.

In this case, referring to FIG. 13, the code execution module 500 may, in an example, include the user setting part 510 which may predefine the action execution function according to user input or generate, modify, delete, and store threshold values for each class attribute to be managed.

In an example, the user setting part 510 may control the class management part 410 to generate or modify and store a definition value for each of a plurality of classes or a text value for a class attribute name corresponding to a corresponding class on the basis of a user's input.

Figure 19:
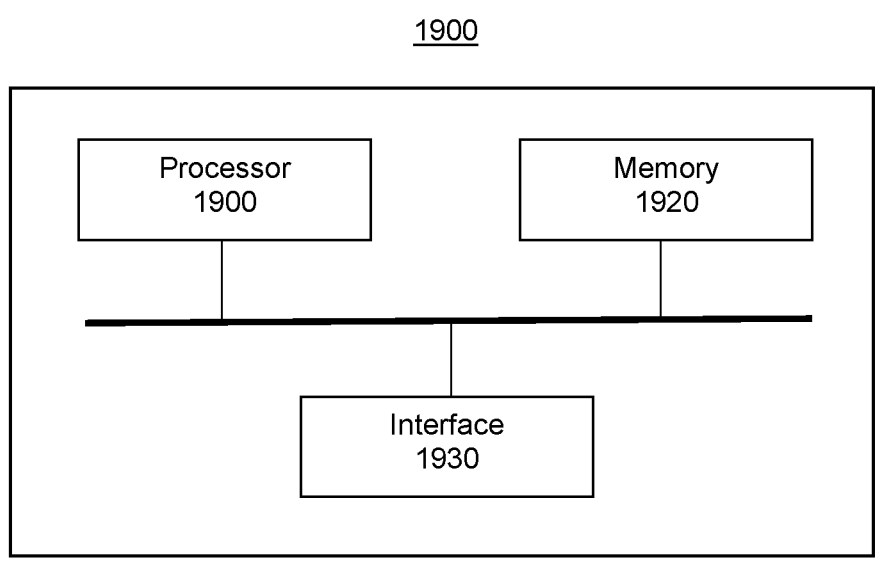
FIG. 19 illustrates an example electronic device according to one or more embodiments.

FIG. 19 illustrates an example electronic device 1900 according to one or more embodiments. Referring to FIG. 19, the electronic device 1900 may include a processor 1910, a memory 1920, and interface 1930.

The processor 1910 may be configured to execute programs or applications to configure the processor 1910 to control the system 300 to perform one or more or all operations and/or methods involving the reconstruction of images, and may include any one or a combination of two or more of, for example, a central processing unit (CPU) and/or a graphic processing unit (GPU), but is not limited to the above-described examples.

The memory 1930 may include computer-readable instructions. The processor 1920 may be configured to execute computer-readable instructions, such as those stored in the memory 1930, and through execution of the computer-readable instructions, the processor 1920 is configured to perform one or more, or any combination, of the operations and/or methods described herein. The memory 1930 may be a volatile or nonvolatile memory.

The interface 1930 (e.g., an I/O interface) may include user interface may provide the capability of inputting and outputting information regarding the system 300, the system 1200, the system 1300, and other devices. The communication interface 1930 may include a network module for connecting to a network and a module for forming a data transfer channel with a storage medium, such as through the medical data acquisition part 120, the body model calling part 140, and/or the body model display part 160. In addition, the user interface may include one or more input/output devices, such as the display part 560, the area text display part 580, a mouse, a keyboard, a speaker, or a software module for controlling the input/output device.

The processors, modules, parts, displays, interfaces, systems, electronic device 1900, processor 1910, memory 1920, interface 1930, system 300, system 1200, system 1300, receiving module 10, data extraction module 20, image calling module 30, object calling module 40, code editing module 50, data registration module 60, display part 70, interest region 80, control part 90, body model display module 100, interest region setting part 200, item storage part 250, code window display part 300, code writing module 400, code execution module 500, medical data acquisition part 120, body model calling part 140, body model display part 160, class management part 410, code writing part 420, variable code generation part 440, function code generation part 460, error determination part 520, function execution part 540, execution area display part 560, area text display part 580, and user setting part 510 described herein and disclosed herein described with respect to FIGS. 1-18 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-18 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A system, the system comprising:
   a receiving module configured to receive medical data from a medical institution server;
   a data extraction module configured to extract text data for a body region from the medical data and to extract attribute-value type state information by attribute for the body region from the text data;
   an image calling module configured to call or generate image data modeling of a position and a shape of the body region by using extracted text data;
   a data registration module configured to store and register the state information for each attribute by matching the state information with the image data called or generated in correspondence to the body region;
   an object calling module configured to call the image data as an object; and
   a code editing module configured to write or edit a programming code for the body region corresponding to a called object according to a received input,
   wherein the code editing module;
   displays a code window on a user terminal screen for receiving user-entered code,
   displays a property selection interface showing preconfigured properties for the user to select from when a symbol code is entered,
   upon property selection, adds a string code representing the selected property name, and
   when an equals code is entered, determines whether a value for the property exists in the registered data, and inserts the value, an initial default value, or user input as the class property value accordingly.

2. The system of claim 1, wherein the code editing module, when the user inputted programming code includes attribute values for a specific attribute of two or more body regions and an operator targeting the attribute values, is configured to perform a group operation on the attribute values according to whether at least one of a range or data type of the attribute and a unit of the attribute value matches.

3. The system of claim 2, wherein, when the region selection command is received through the interface, the display part is configured to display the one or more body regions in the user terminal screen according to the region selection command to receive user selection information, and
   the system further comprises:
   an interest region designation part configured to designate a selected body region corresponding to the received selection information as a region of interest according to an input; and a control part configured to control the code editing module so that the designated region of interest is objectified and programmed.

4. The system of claim 3, wherein the display part is configured to display the region selection command in one of a list format, a check box format, and a radio button format.

5. A processor-implemented method, the method comprising:
receiving medical data from a medical institution server;
extracting text data for one or more body regions from received medical data and extracting attribute-value type state information by attribute for the body region from the text data;
generating image data to model a position and a shape of the one or more body regions by using the extracted text data;
storing and registering the state information for each attribute by matching the state information with the image data in correspondence to the body region;
calling the generated image data as a called object; and
generating a programming code for the body region corresponding to the called object according to an input,
wherein the generating of the programming code comprises:
displaying a code window on a user terminal screen for receiving user-entered code,
displaying a property selection interface showing pre-configured properties for the user to select from when a symbol code is entered,
upon property selection, adding a string code representing the selected property name, and
when an equals code is entered, determining whether a value for the property exists in the registered data, and inserting the value, an initial default value, or user input as the class property value accordingly.

6. The method of claim 5, further comprising:
displaying the object on a user terminal screen according to a received request; and
providing an interface for receiving a region selection command for selecting one or more selected body regions in an area on the screen corresponding to the object.

7. The method of claim 6, wherein in the providing, when the region selection command is received, the one or more selected body regions illustrated in the screen area according to the region selection command is displayed in one of a list format, a check box format, and a radio button format to receive user selection information, and
wherein the method further comprises:
designating a designated body region corresponding to the received selection information as a region of interest; and
controlling the designated region of interest to be objectified and programmed before the generating of the programming code.

8. The method of claim 5, wherein the received medical data is received from a medical institution server.

9. The method of claim 5, wherein the generating of the image data comprises calling the image data.

10. The method of claim 5, wherein the generating of the programming code comprises one of editing or writing the programming code.

11. An electronic apparatus, the apparatus comprising:
a processor configured to execute instructions; and
a memory storing the instructions, wherein execution of the instructions configures the processor to:
extract text data for a body region from received medical data and extract attribute-value type state information by attribute for the body region from the text data;
generate image data including modeling of a position and a shape of the body region by using the extracted text data;
store and register state information for each attribute matching the state Information with the image data called or generated in correspondence to the body region;
call the image data as an object; and
write or edit a programming code for the body region corresponding to a called object according to a received input,
wherein calling the image data includes:
displaying a code window on a user terminal screen for receiving user-entered code,
displaying a property selection interface showing preconfigured properties for the user to select from when a symbol code is entered,
upon property selection, adding a string code representing the selected property name, and
when an equals code is entered, determining whether a value for the property exists in the registered data, and inserting the value, an initial default value, or user input as the class property value accordingly.

* * * * *